Jan. 27, 1959     A. C. ALBEE ET AL     2,870,975

SOUND FILM REPRODUCER DRIVING SYSTEM

Filed Feb. 25, 1953     4 Sheets-Sheet 1

INVENTORS.
*Arthur C. Albee &*
*James L. Pettus*

BY

*ATTORNEY.*

Jan. 27, 1959

A. C. ALBEE ET AL 2,870,975

SOUND FILM REPRODUCER DRIVING SYSTEM

Filed Feb. 25, 1953

INVENTORS.
Arthur C. Albee &
James L. Pettus
BY
ATTORNEY.

INVENTORS.
Arthur C. Albee &
James L. Pettus
BY
Srl R. Goshow
ATTORNEY.

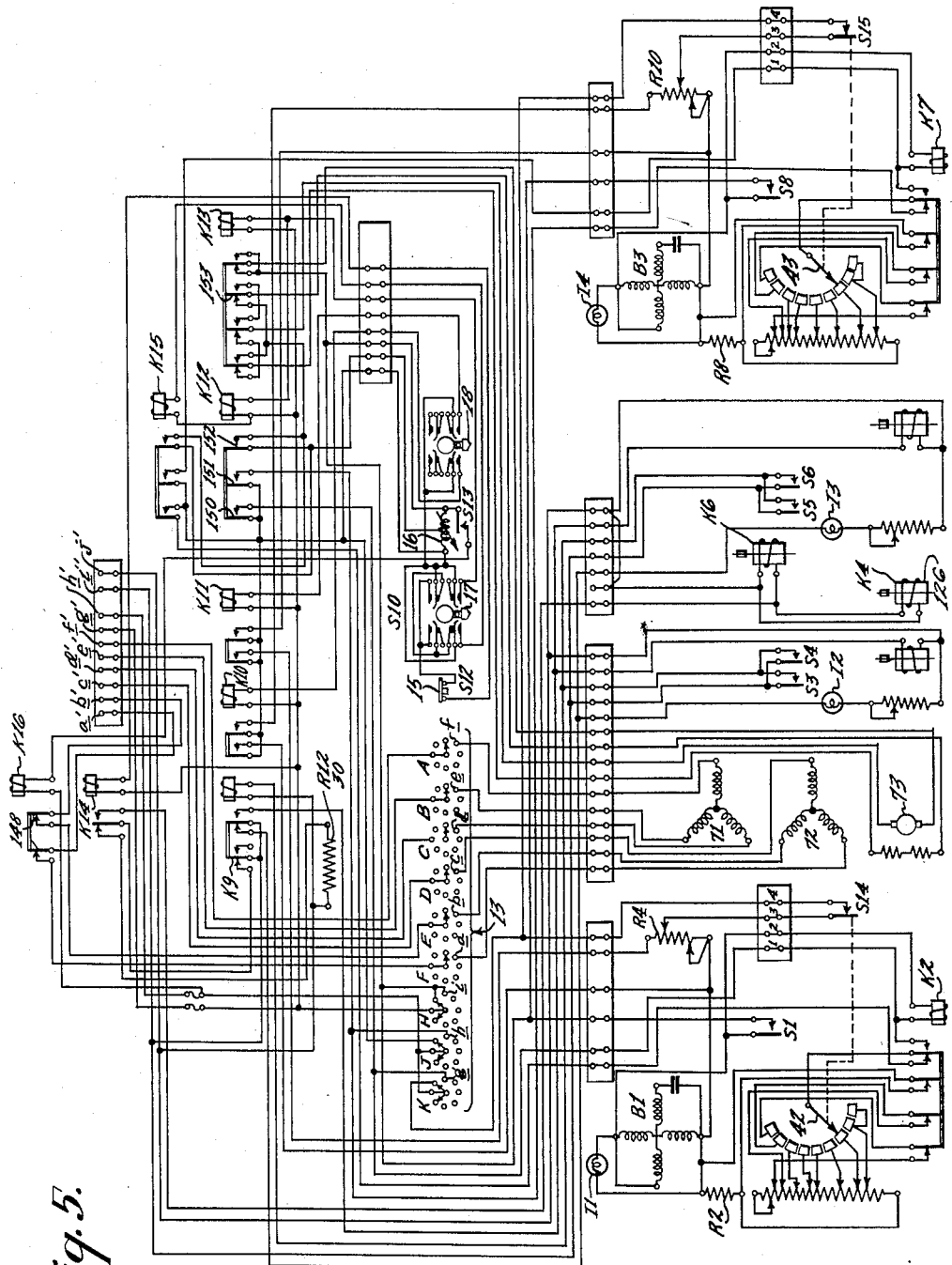

United States Patent Office 2,870,975
Patented Jan. 27, 1959

2,870,975

SOUND FILM REPRODUCER DRIVING SYSTEM

Arthur C. Albee, Burbank, and James L. Pettus, Encino, Calif., assignors to Radio Corporation of America, a corporation of Delaware Application February 25, 1953, Serial No. 338,736

6 Claims. (Cl. 242—55.12)

This invention relates to sound film apparatus, and particularly to a sound reproducing system used in the transfer of certain signals on a sound film roll by re-recording to a second film.

In the production of motion pictures, the sound for the various picture sequences is recorded on a film separate from the picture film, and several "takes" are generally made of the same scene. Therefore, there will be, on the sound film roll, a series of sound sections or sequences for the same picture sections or sequences, some of which have been cued or marked as "N. G.," or unsatisfactory and not to be used, and others of which have been cued or marked "O. K.," or satisfactory and to be used with its particular picture sequence. Since a roll of sound film, either photographic or magnetic, contains such a series of satisfactory and unsatisfactory sequences, and it is only the satisfactory sequences which are desired, the original film is run through a reproducing machine and only the satisfactory sound sequences are rerecorded to a second film, either photographic or magnetic. To expedite this transfer, the present sound reproducer has been conceived, and although also adaptable to photographic film, the particular reproducer shown is for magnetic sound films of either thirty-five millimeter or seventeen and one-half millimeter widths. It is also adaptable for films of other widths.

The sound reproducer has many features, some of which have been disclosed and claimed in co-pending U. S. applications mentioned hereinafter, the present invention disclosing the film drive which permits the film to be advanced at normal reproducing speed during the transfer operation, at four or five times normal speed in advancing the film for sequences not to be rerecorded and for reversal of the film, and at approximately ten times normal speed during the rewind operations. This permits the satisfactory "takes" to be rapidly presented before the magnetic reproducing head for reproduction, to rapidly ready the sequence for a repetition of a sequence, and to very rapidly rewind the film in either direction. The reproducing machine described herein is adaptable for either thirty-five millimeter or for seventeen and one-half millimeter sound film using the same guide rollers, but by threading the film through different reproducing elements. There are many safety features embodied in the system to aid in threading the film and to obtain a uniform film motion at the reproducing points.

The principal object of the invention, therefore, is to facilitate the reproduction and transfer of selected sound signals from one sound record to another.

Another object of the invention is to provide an improved sound reproducing and transfer sound film driving mechanism.

A further object of the invention is to provide an improved film advancing mechanism which has different film advancing speeds and different rewind speeds.

A still further object of the invention is to provide a sound film reproducer adaptable for film of different widths and which may vary the speeds of advancement thereof according to whether or not a certain film section is being reproduced or a certain section to be reproduced is being located.

The novel features which are believed to be characteristic of this invention, both as to its organization and the mode of its operation, as well as additional objects and advantages thereof, will be better understood from the following description, when read in conjunction with the accompanying drawings, forming a part hereof, in which:

Fig. 5 is a schematic drawing of the control circuits embodied in the invention.

Figure 1:
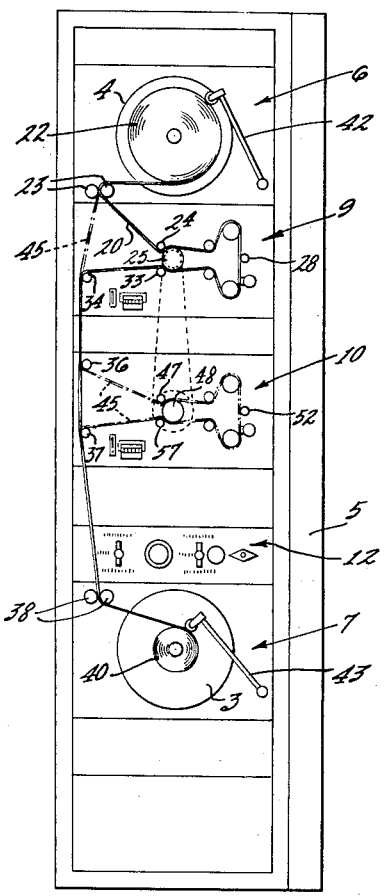
Fig. 1 is a front, elevational view of a sound reproducer embodying the invention.

Referring now to the drawings, in which the same numerals identify like elements, a vertical control frame 5 has mounted on or attached to it at the top thereof, a film reel panel 6, and at the bottom, a film reel panel 7. Also mounted on the frame 5, is a thirty-five millimeter magnetic sound film reproducing panel 9, below which is a seventeen and one-half millimeter magnetic sound film reproducing panel 10. Between the panels 7 and 10, is a motor control panel 12, shown enlarged in Fig. 2.

Figure 2:
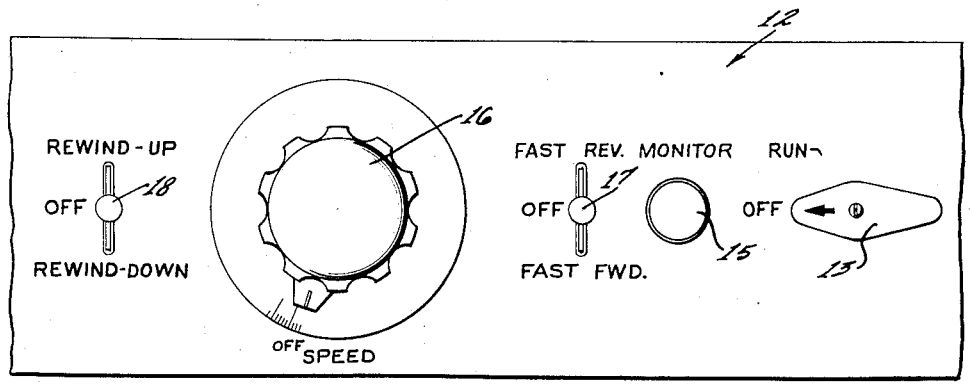
Fig. 2 is an enlarged view of the film advancing control panel of the reproducer of Fig. 1.

The control panel includes a switch control knob 13 having "off" and "run" positions. The switch 13 is a multi-contact switch and is shown in Fig. 5 as having sections A, B, C, D, E, F, H, J, and K. The position of the swingers of the sections A–K, inclusive, are for the "off" position of the knob 13, as shown in Fig. 2. Also mounted on panel 12, is a monitor push-button switch 15, a variable autotransformer control 16, and switches 17 and 18; switch 17 having "off," "fast reverse," and "fast forward" positions; and switch 18 having "off," "rewind down," and "rewind up" positions. These switches have been given the same numbers in Fig. 5.

Figure 3:
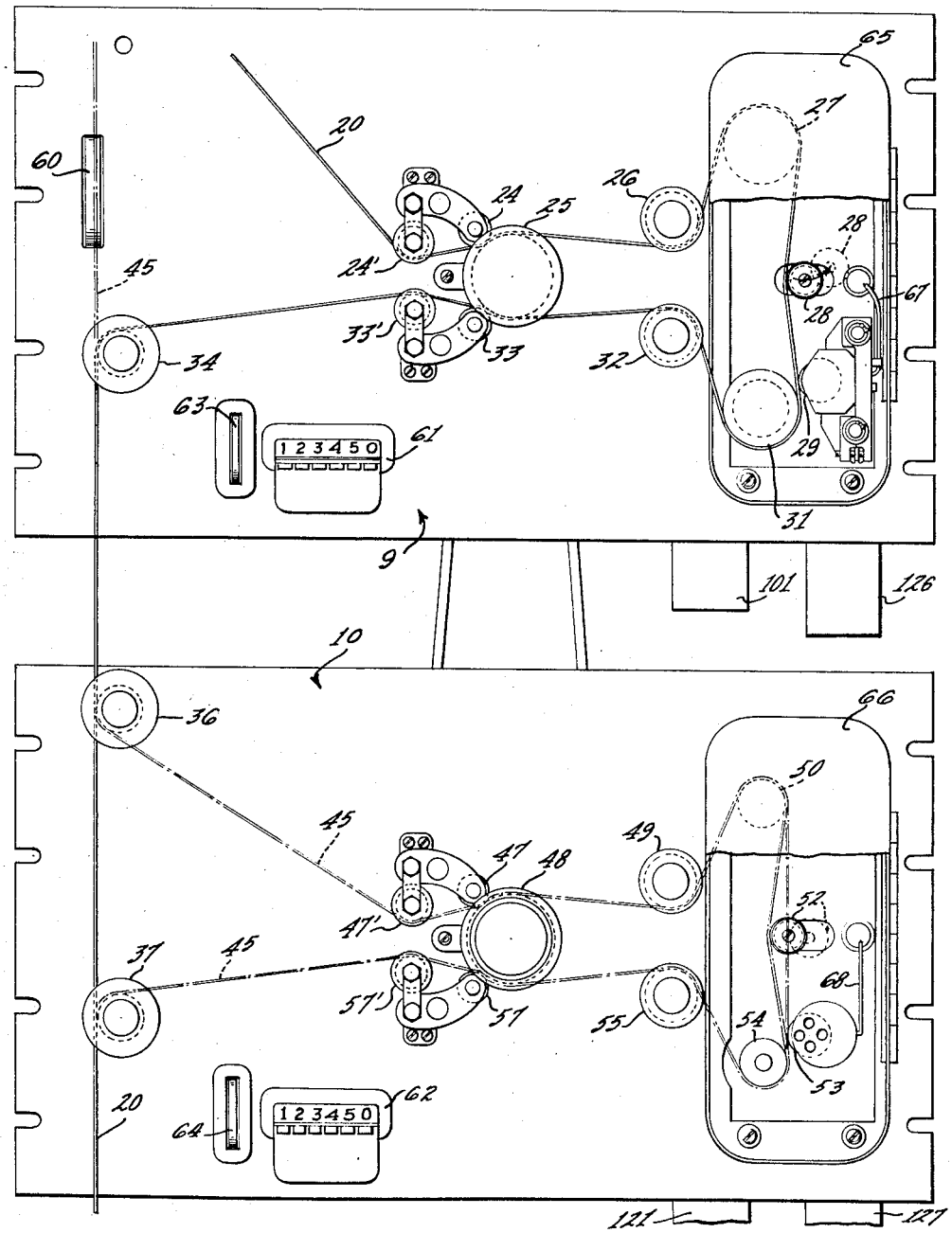
Fig. 3 is an enlarged front view of the reproducing sections for films of two widths.
Figure 4:
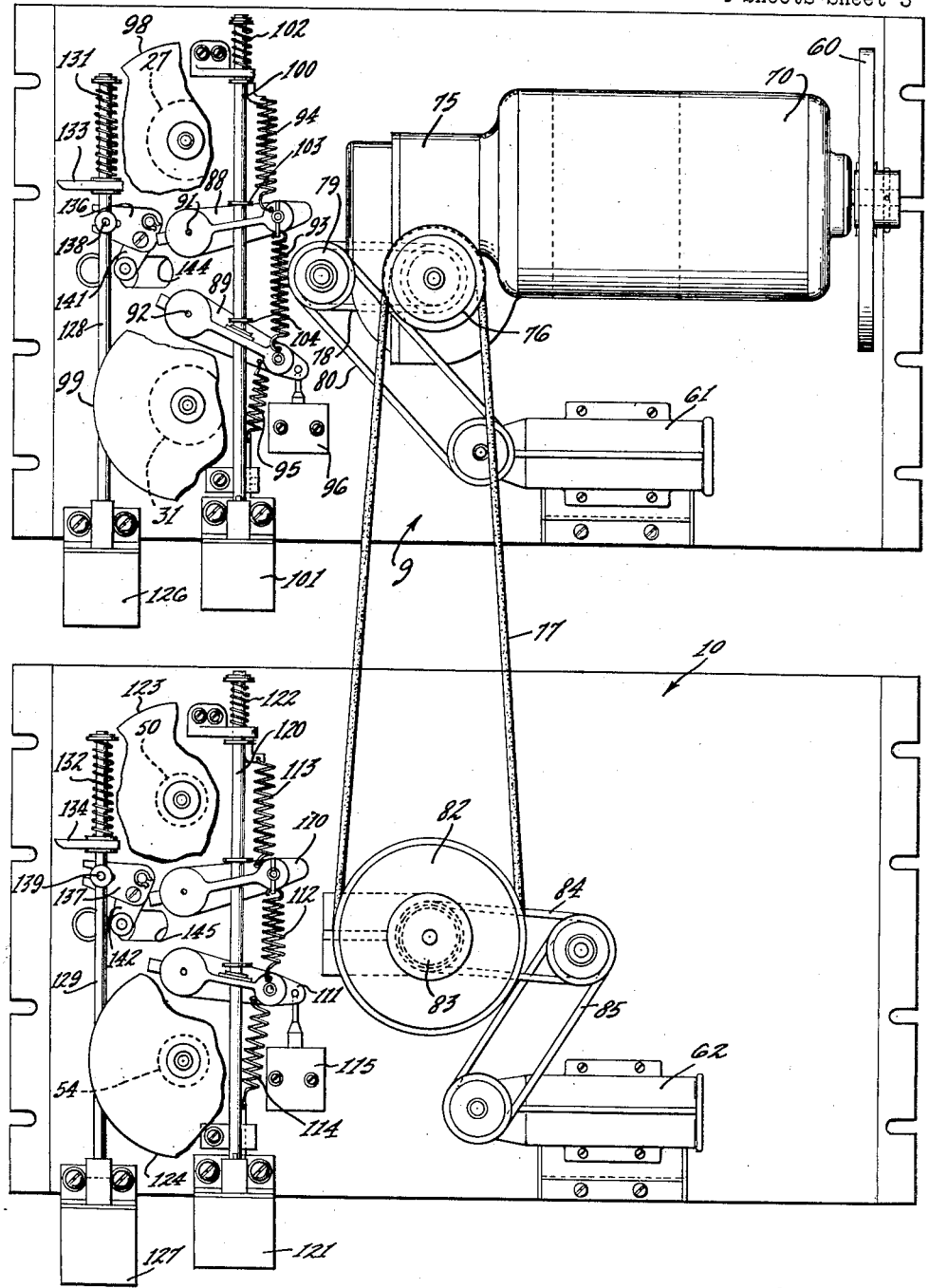
Fig. 4 is an enlarged rear view of the sections shown in Fig. 3.

Referring now to Figs. 1, 3, and 4, a film 20, shown by the solid lines, may be advanced in either direction. For purposes of explanation, it will be assumed that the film 20 is being supplied from a roll 22 on a reel 4 between rollers 23 which actuate the switch S1 in Fig. 5. The film then passes around a guide roller 24' and a pad roller 24, the latter actuating switch S3 in Fig. 5 when its arm is moved. The film then passes over film advancing sprocket 25, around a tensioning roller 26, a film-pulled stabilizing roller 27 having a flywheel 98 mounted on its shaft, past a film lifting roller 28, a soundhead 29, which may be a single or a triple head, as disclosed and claimed in co-pending U. S. application Ser. No. 230,403, filed June 7, 1951, now Patent No. 2,644,856 of July 7, 1953, around a film speed stabilizing roller 31 having a flywheel 99 on its shaft, a tensioning roller 32, sprocket 25, a pad roller 33, which actuates switch S4 in Fig. 5 when its arm is moved, a guide roller 33', a guide roller 34, past guide rollers 36 and 37, between rollers 38, which operate switch S8 shown in Fig. 5, and then to film roll 40 on reel 3. Shown positioned on the rolls 22 and 40, are the rollers of pivoted arms 42 and 43, which function to vary the voltage to the reel driving motors B1 and B3, as disclosed and claimed in co-pending U. S. application, Ser. No. 251,370, filed October 12, 1951, now Patent No. 2,733,875 of February 7, 1956. The above described film path is for thirty-five millimeter magnetic film to be reproduced on panel 9.

When seventeen and one-half millimeter magnetic sound film is to be reproduced, it is threaded from roll 22 on reel 4, as shown by the broken lines 45, wherein the film again passes between rollers 23, then past rollers 34 and 36, then past guide roller 47′, then around pad roller 47, which operates switch S5 shown in Fig. 5 when its arm is moved, over seventeen and one-half millimeter film drive sprocket 48, around tensioning roller 49, over film stabilizing roller 50 having a flywheel 123 on its shaft, past a film lifting roller 52, similar to roller 28, past a magnetic reproduce head 53, around film stabilizing roller 54 having a flywheel 124 on its shaft, film tensioning roller 55, over sprocket 48, under pad roller 57, which operates switch S6 in Fig. 5 when its arm is moved, over guide roller 57′, around guide roller 37, between rollers 38, to the film roll 40 on reel 3. Also shown on the panel 9 in Fig. 3, is a slot through which the edge of a flywheel 60 of a motor 70 is shown. On each panel, the numerals of film counters 61 and 62 are shown, these counters being manually adjustable by wheels 63 and 64, respectively. The magnetic heads are included within shields 65 and 66, the head output cables being shown at 67 and 68. The different positions of film lifting rollers 28 and 52 are shown in dotted lines.

Referring now to Fig. 4 particularly, the rear views of the panels 9 and 10 show the film sprocket motor 70, which has both a series section and an interlock section, the interlock section being shown by rotor 71 and stator 72 in Fig. 5, and the series section being shown at 73. Through a gear reduction box 75, a pulley 76 for a toothed belt 77 is driven. The motor also drives a chain sprocket 78, which drives a sprocket 79 to drive a chain 80 of the footage counter 61. The toothed belt 77 drives a pulley 82, which, by means of sprocket 83, drives a chain 84, and a chain 85 of the footage counter 62. On the shaft of pulley 76, is the sprocket 25 for advancing the thirty-five millimeter film, and on the shaft of pulley 82, is the sprocket 48 for advancing the seventeen and one-half millimeter film. It will be noted that the pulleys 76 and 82 have different diameters to compensate for different film reproducing speeds for the thirty-five and seventeen and one-half millimeter films.

Referring now to the remaining sections of Fig. 4, the tensioning rollers 26 and 32 are mounted on the ends of webbed arms 88 and 89, which are pivoted at 91 and 92, and have their roller carrying ends biased by an interconnecting spring 93. These arms are also biased apart by springs 94 and 95, oscillations being damped by a dashpot 96. The stabilizing rollers 27 and 31 are shown partially with their respective flywheels 98 and 99. The basic principles of this film drive stabilizing system are shown in co-pending U. S. application, Ser. No. 251,384, filed October 15, 1951, now Patent No. 2,687,883 of August 31, 1954, and Ser. No. 251,877, filed October 18, 1951, now Patent No. 2,687,884 of August 31, 1954.

To provide the proper threading positions of the rollers 26 and 32, the arms 88 and 89 are adjusted to fixed positions by a rod 100 actuated by a solenoid 101 against the tension of a spring 102. The arms 88 and 89 are positioned by having the washers 103 and 104 contact the webs of the arms 88 and 89, as explained in detail in these two last mentioned patents. For the seventeen and one-half millimeter unit, similar arms 110 and 111 are provided with their respective springs 112, 113, and 114. This unit also has a dashpot 115 for stabilizing the oscillation of arms 110 and 111, and a film positioning rod 120 with its solenoid 121 and bias spring 122. In this unit likewise, the stabilizing rollers 50 and 54 are shown partially with their respective flywheels 123 and 124.

To permit the film to be rapidly rewound or advanced without contacting the magnetic heads 29 and 53, rollers 28 and 52 are provided for removing the film from contact with these heads. This is accomplished by the solenoids 126 and 127, these solenoids operating respective rods 128 and 129 against the tension of springs 131 and 132, guides 133 and 134 being provided for the respective rods 128 and 129. When the solenoids are energized, they move crank arms 136 and 137 by the pins 138 and 139, which are positioned in slots in the ends of the arms 136 and 137, respectively. When the rods 128 and 129 are pulled downwardly, the arms 141 and 142, to which rollers 28 and 52 are attached, are moved to the right in the respective slots 144 and 145. This moves the film to the left, as shown in Fig. 3, so that it does not contact the respective heads. This reduces wear on both the heads and the film, which is particularly severe when the film are advanced at high speeds. Thus, for fast advancement at approximately four or five times normal speed, the solenoids 126 and 127 are energized. The solenoids 126 and 127 are shown at K4 and K6, respectively, in Fig. 5, and are under control of switches S10 or 17 and S12, which energize relay K14, S12 being operated by button 15 to open this switch and de-energize relay K14. Thus, the film may be returned to the heads for short periods at any time for the purpose of detecting cues or synchronization marks during the rapid advancement of the film.

Referring now to the control circuit shown in Fig. 5 and the control panel shown in Fig. 2, when the switch 13 is moved to "run" position, the contacts a, b, and c are made, which connect the stator terminals a′, b′, and c′ to the stator windings 72 over the respective conductors, which pass through a pair of normally closed contacts 148. Simultaneously, contacts d, e, and f connect the rotor of an interlock distributor, not shown, from terminals d′, e′, and f′ to the rotor windings 71. At this time, the switches 17 and 18 are in their "off" positions, and the interlock section of motor 70 is now energized to advance either the thirty-five millimeter or seventeen and one-half millimeter film at their normal reproducing speeds. With the switch 13 in "run" position, contacts g, h, and i are made, which connects the reel motor B1 to power terminal g′ and h′ over switch S1, which has been closed by the insertion of film between rollers 23, and which connects the reel motor B3 to the same power terminals over switch S8, which has been closed by the insertion of film between rollers 38.

The above connections will start the advancement of the film of either width, depending upon through which reproducer panel it is threaded, the motor B1 controlling the tension in the film as it leaves roll 22 on reel 4, and the motor B3 controlling the tension in the film as it is wound on roll 40 of reel 3. These motor circuits for motors B1 and B3 function in the same manner as disclosed and claimed in the above-mentioned Patent No. 2,733,875 of February 7, 1956, the arms 42 and 43 moving over their respective contacts as the film roll diameters vary to vary the torque on the motors to maintain the film tension substantially constant. During this operation, the detected sound on the film may be transmitted to another recorder, either photographic or magnetic.

Assuming now that a satisfactory sound sequence has been detected and rerecorded, and the cue marks indicate that the next sequence is unsatisfactory and no transfer or rerecording thereof is to be made. At this time, the switch knob 13 is returned to its "off" position, as shown in Fig. 2, which positions the swingers as shown in Fig. 5. When switch sections A–K, inclusive, are in their "off" positions, circuits are then made to the switches 17 and 18 and the variac 16 from the power terminals g′ and i′. Now, assume that it is desired to advance the film at a speed of from four to five times normal in the same direction that the satisfactory sequence was advanced. Switch 17 is then moved to its lower position and a circuit made through its contacts from power terminals g′ and h′ to relay K12, and also, through the normally closed contacts of K13. The energization of relay K12 closes contacts 150, 151, and 152. The closing of contact 150 connects motor B1 across power terminals g' and h'; the closing of contact 151 connects motor B3 to these power terminals; and the closing of contact 152 places power from the power terminals on closed contacts 153 of the relay K13. Power is applied through these circuits to the series motor 73, which circuits, however, include the variac 16, when adjusted to any position but its "off" position. However, when switch 17 is thrown, the variable autotransformer 16 is in its normal "off" position. The energization of motors B1 and B3 at this time simply tighten the film, but the film is not advanced because the motor 73 is not energized.

To advance the film, the variable autotransformer 16 is now rotated to increase the voltage on the motor 73 to any value so as to provide any desired film speed, such as four or five times normal. When the variable autotransformer 16 is turned from its "off" position, it closes switch S13, which places power on relay K16, opening its contacts 148, which breaks the circuit from the power terminals a', b', to the contacts of switches E and F, which feed the stator 72 of the interlock motor. This is a safety feature, which prevents the energization of the interlock motor in the event that the variable autotransformer has not been returned to its "off" position.

During this fast advancement of the film, the take-up reel torque motor B3 has a greater torque thereon because of the elimination of a resistor R8 through certain normal closed contacts of relay K7. At the same time, resistor R2 is in the energizing circuit for the supply reel torque motor B1 to place a certain small amount of torque thereon to maintain a slight tension in the film. This is accomplished by the energization of relay K2, which opens certain of its contacts.

The film is thus advanced at a rapid rate until the next cue mark is found either by visual observation, or by operating the monitor switch to drop the film on a reproducing head, or by actual footage cues noted on the footage counters 61 and 62. If the cue mark indicates an "O. K." take, the switch 17 is thrown to its "off" position, and the switch 13 is then thrown to its "run" position and circuits are then made, as described above. If the cue indicates an "N. G." take, the rapid advancement of the film can continue. If a certain sequence has been passed inadvertently or purposely, and it is desired to reverse the film to again advance it in the reproducing direction, switch 17 is thrown to its upper position.

This operation connects power from terminals g' and h' through the contacts of switch 17 to relay K15 and relay K13. The energization of relay K15 closes its contacts, which are similar to contacts 150, 151, and 152 of relay K12, and which energize the motors B1 and B3, but with inverted torque conditions. That is, the former supply reel motor B1 now has a greater torque by the removal of resistor R2 from its energizing circuit by the de-energization of relay K2, and the former take-up reel motor B3 now has a lesser torque produced by resistor R8 being in its energizing circuit by the energization of relay K7. The energization of relay K13 interchanges its contacts for the purpose of reversing the power supplied to series motor 73 to reverse its direction of rotation. The variable autotransformer 16 is again adjusted to give the desired reverse speed. With the switch 17 in either position, the solenoids 126 and 127, shown on Fig. 5, are energized by the energization of relay K14, which moves rollers 28 and 52 to remove the film from the magnetic heads. When the film has been reversed to its desired position, the switch 17 is thrown to its "off" position. At this time, the switch 13 may again be operated to reproduce the sequence at reproducing speed.

Assuming that the entire roll of film containing the various sequences has been completely advanced through the reproducer, some of which have been rerecorded and some not, the film is now rethreaded from roll 40 to roll 22 by passing it between rollers 38, over rollers 37, 36, and 34, and between rollers 23. When this is accomplished, the insertion of film between rollers 23 and 38 closes switches S1 and S3, as explained above, which closes one side of the power line. The fact that switches S1 and S8 are open when no film is threaded in the reproducer prevents energization of the motors at this time. These switches are opened when the film has passed through the reproducer, which stops the motors.

To advance the film to the original supply reel, the switch 18 is thrown to its "rewind up" position. With the switch so adjusted, a connection is made between the power terminals g' and h' through the contacts of switch 18, energizing relay K10 to close its normally open contacts. This completes a circuit from the power terminals g' and h' to the reel motors B1 and B3, full power being impressed on motor B1, which is now taking up the film, and power being impressed on the original take-up reel motor over resistor R10 for the purpose of providing motor B3 with a small holdback torque. Thus, the latter circuit simply and directly energizes only the reel motors B1 and B3 and the film is rewound at a rapid rate due to full power on the upper reel motor, which may rewind the film at a speed of ten times normal.

Assuming that it is desired to start reproduction of a sound sequence starting at a point between the ends of the film roll, such as a 1000-foot roll, and the film has been completely rewound on the upper supply reel, then the switch 18 is thrown to its "rewind down" position to advance the film from the upper reel 4 to the lower reel 3. In this case, the film threading stays the same as above described for rewinding up, but the circuits through the lower position of switch 18 now place power from terminals g' and h' on relay K11, which closes its normally open contacts. Under these circumstances, the take-up reel motor B3 is now fed directly from the power line, while the supply reel motor B1 is fed over a resistor R4 to provide the desired holdback torque. Then, by a cue mark of one type or another, the film can be stopped at the beginning of the proper sequence, and threaded through the desired reproducer panel according to its width.

As described in the above-mentioned Patents Nos. 2,687,883 and 2,687,884, the tensioning rollers 26, 32, 49, and 55 are held in fixed positions to give a fixed film path between the sprockets 25 and rollers 27 and 29 for panel 9 and sprocket 48 and rollers 50 and 54 for panel 10 to aid in properly threading the film. Briefly, this is accomplished by the closing of any one of switches S3, S4, S5, or S6, which are closed by the opening of the pad rollers 42, 54, 55, and 56, respectively. These switches are all in parallel, so that the closing of any one of them will energize solenoids 101 and 121, solenoid 101 holding arms 88 and 89 in fixed positions, and solenoid 121 holding arms 110 and 111 in fixed positions, which fixedly positions the tensioning roller 26, 32, 49, and 55, respectively. The closing of these switches energizes relay K9 from direct current power terminals i' and j'. The energization of the relay K9 will interchange its terminals, as shown in Fig. 5, which applies power to the solenoids 101 and 121. When the relay K9 is not energized, the normally closed contacts of this relay place a load, which is resistor R12, across the line, so that the load across the direct current terminals i' and j' remains the same at all times. Tell-tale lamps I2 and I3 indicate whether switches S3, S4, S5, or S6 are closed or open. Tell-tale lamps I1 and I4 indicate whether or not the torque motors B1 or B3, respectively, are energized.

Switches S14 and S15 are actuated by arms 42 and 43, respectively. That is, when these arms are in their latched positions where they are held for the purpose of placing a film roll on the reel spindles, they open switches S14 and S15. Now, when the arms are placed on the film rolls, as shown in Fig. 1, the switches S14 and S15 are closed. The closing of the switches places a small amount of power over resistors R4 and R10 on the two reel motors to supply a small amount of torque thereto. This small amount of torque holds the film tight between the sprockets and the reels so it does not become unwound or start out with a jerk which would occur if loose loops were present.

There has been provided, therefore, a sound reproducer for magnetic films of different widths which is flexible in its speed of film advancement for rapidly reproducing and transferring sound signals from a roll of film having sequences of satisfactory and unsatisfactory sound records thereon. The reproducer reproduces the signals with high fidelity and incorrect operation is prevented by the many safety features described above.

We claim:

1. A film driving system for a sound reproducer of a record on film comprising a vertical frame having serially arranged panels, a reproducer for said record on said film, a motor mounted on a centrally located panel of said frame, said motor having two sections, means driven by one of said sections of said motor for advancing said film at sound reproducing speed, said means being driven by said other section of said motor for advancing said film at speeds greater than said sound reproducing speed, a film takeup reel on one end panel of said frame, a second motor directly connected to said reel, a film supply reel on the other end panel of said frame, a third motor directly connected to said supply reel, said film being advanced from said supply reel to said takeup reel through said reproducer, a power source for said first-mentioned motor, a switch adapted to connect said first-mentioned section of said motor to said power source for advancing said film in one direction between said reels at a constant sound reproducing speed, and a second power source, said switch being adapted to connect said second power source to said second-mentioned section of said first-mentioned motor for advancing said film at a variable speed in the same direction between said reels, means for controlling the amount of power impressed on said second-mentioned section of said first-mentioned motor to vary the speed of advancement of said film between said reels at greater than normal reproducing speed, and means for connecting said second power source to said second and third motors, said means driven by said first and second-mentioned sections of said first-mentioned motor including a first sprocket on said centrally located motor panel for film of one width, a second sprocket on a second centrally located panel for film of a second width, and interconnecting driving means between said sprockets, said interconnecting driving means providing a different speed for said second sprocket from that of said first sprocket.

2. A film drive system in accordance with claim 1 in which means are provided for controlling the amount of power supplied from said second-mentioned power source to said second and third-mentioned motors, said switch controlling said connecting means last mentioned.

3. A film drive system in accordance with claim 2 in which additional switch means are provided for reversing the connections between said second-mentioned power source and said second-mentioned section of said first-mentioned motor and between said second-mentioned power source and said second and third-mentioned motors for reversing the advancement of said film.

4. A sound film reproducing apparatus comprising a frame, a serial-arranged plurality of panels mounted on said frame, a film reel mounted on each of the end panels of said plurality of panels, a motor for directly driving a respective film reel mounted on its respective panel, a pair of sound film reproducing panels intermediate said reel panels, one of said sound reproducing panels being adapted to reproduce film of one width passing from one of said reels to another, and the other of said sound reproducing panels being adapted to reproduce film of a second width passing from one of said reels to the other, film advancing means on each of said pair of sound film reproducing panels, a third motor mounted on one of said film reproducing panels for simultaneously driving both the said film advancing means at different constant speeds for advancing film through both of said panels at mutually exclusive periods, and a motor control panel intermediate one of said reel panels and one of said film reproducing panels, said motor control panel controlling the energization of said respective motors in accordance with any desired rate of speed of advancement of said films in the same or reverse directions between said reels.

5. A sound film reproducing apparatus in accordance with claim 4 in which said film advancing third motor is a two-section motor, there being provided one power source for one section of said motor for advancing said film at normal constant reproducing speed in one direction, a second power source for the other section of said motor for advancing said film at a variable higher rate than normal reproducing speed in two directions, and switch means for interconnecting said second power source to said reel motors for advancing said film in two directions directly between reels at a variable higher rate of speed than said normal reproducing speed.

6. A sound film reproducing apparatus in accordance with claim 5 in which said sound reproducing panels include magnetic reproducing heads over which said film is adapted to be advanced by said third motor, together with rollers for lifting said film off of said heads, solenoids for activating said rollers, the energization of said solenoids moving said rollers in a direction to remove said film from said heads, and means connected to said motor control panel for energizing said solenoids when said other section of said third motor is connected to said second power source.

References Cited in the file of this patent

UNITED STATES PATENTS

| | | |
|---|---|---|
| 1,758,794 | Hoxie | May 13, 1930 |
| 1,891,738 | Thomas | Dec. 20, 1932 |
| 1,936,043 | Thomas | Nov. 21, 1933 |
| 1,996,476 | Krause | Apr. 2, 1935 |
| 2,114,608 | Ross | Apr. 19, 1938 |
| 2,354,679 | Frankel | Aug. 1, 1944 |
| 2,412,551 | Pratt | Dec. 10, 1946 |
| 2,560,254 | Shickel | July 10, 1951 |
| 2,631,855 | Kornei | Mar. 17, 1953 |
| 2,657,870 | Pettus | Nov. 3, 1953 |
| 2,658,952 | Harsant et al. | Nov. 10, 1953 |
| 2,670,906 | Daniels et al. | Mar. 2, 1954 |
| 2,726,048 | Crain | Dec. 6, 1955 |
| 2,733,875 | Hittle | Feb. 7, 1956 |